(12) United States Patent
Tammera

(10) Patent No.: US 10,368,678 B2
(45) Date of Patent: Aug. 6, 2019

(54) COOKING VESSEL WITH OR WITHOUT RETAINABLE COVER AND METHOD OF MAKING THE SAME

(71) Applicant: Robert F. Tammera, Warrenton, VA (US)

(72) Inventor: Robert F. Tammera, Warrenton, VA (US)

( * ) Notice: Subject to any disclaimer, the term of this patent is extended or adjusted under 35 U.S.C. 154(b) by 0 days.

(21) Appl. No.: 15/730,055

(22) Filed: Oct. 11, 2017

(65) Prior Publication Data

US 2018/0098657 A1    Apr. 12, 2018

Related U.S. Application Data

(60) Provisional application No. 62/407,199, filed on Oct. 12, 2016, provisional application No. 62/562,819, filed on Sep. 25, 2017.

(51) Int. Cl.
| | |
|---|---|
| *A47J 27/56* | (2006.01) |
| *A47J 27/00* | (2006.01) |
| *A47J 36/08* | (2006.01) |
| *A47J 45/06* | (2006.01) |
| *A47J 36/02* | (2006.01) |
| *A47J 37/10* | (2006.01) |
| *A47J 27/58* | (2006.01) |

(52) U.S. Cl.
CPC .......... *A47J 27/002* (2013.01); *A47J 36/02* (2013.01); *A47J 36/08* (2013.01); *A47J 37/101* (2013.01); *A47J 45/061* (2013.01); *A47J 2027/006* (2013.01)

(58) Field of Classification Search
CPC .......... A47J 27/002; A47J 36/02; A47J 36/08; A47J 37/101; A47J 45/061; A47J 2027/006; A47J 27/56
USPC ........................... 220/573.1, 669, 753
See application file for complete search history.

(56) References Cited

U.S. PATENT DOCUMENTS

| | | | |
|---|---|---|---|
| 656,855 A | 8/1900 | Pinlott | |
| 890,203 A | 6/1908 | Vaughan | |
| 2,348,452 A | 5/1944 | Christopher | |
| 2,428,839 A | 10/1947 | Salino | |
| 2,506,957 A * | 5/1950 | Gomez | A47J 37/101 |
| | | | 126/384.1 |
| 2,520,382 A * | 8/1950 | Conrad | A47J 36/08 |
| | | | 210/465 |
| 2,702,143 A * | 2/1955 | Williamson | A47J 37/101 |
| | | | 220/369 |
| 4,000,830 A | 1/1977 | French | |
| 4,590,919 A | 5/1986 | Spani | |
| 6,105,810 A * | 8/2000 | Daenen | A47J 27/212 |
| | | | 220/366.1 |
| 7,086,326 B2 * | 8/2006 | Yokoyama | A47J 36/36 |
| | | | 126/369 |
| 7,878,110 B1 * | 2/2011 | Michnik | A47J 36/14 |
| | | | 210/464 |
| 2004/0216620 A1 * | 11/2004 | Quiggins | A47J 36/08 |
| | | | 99/413 |

(Continued)

*Primary Examiner* — J. Gregory Pickett
*Assistant Examiner* — Niki M Eloshway
(74) *Attorney, Agent, or Firm* — Greenblum & Bernstein, P.L.C.

(57) ABSTRACT

Cooking vessel that includes a container bottom, a container top comprising a flared section extending to a rim and at least one handle coupled to or extending from an outside surface of the flared section.

20 Claims, 10 Drawing Sheets

(56) References Cited

U.S. PATENT DOCUMENTS

| | | | | |
|---|---|---|---|---|
| 2008/0308489 A1* | 12/2008 | Coudurier | ............... | A47J 36/08 |
| | | | | 210/469 |
| 2013/0119069 A1* | 5/2013 | Groll | ....................... | A47J 36/08 |
| | | | | 220/573.1 |
| 2014/0224810 A1* | 8/2014 | Bar-Akiva | ............ | A47J 27/002 |
| | | | | 220/573.1 |
| 2014/0346108 A1* | 11/2014 | Josse | ......................... | C02F 1/20 |
| | | | | 210/605 |
| 2014/0353316 A1* | 12/2014 | Lin | ......................... | A47J 36/10 |
| | | | | 220/573.1 |
| 2015/0164268 A1* | 6/2015 | Hurley | .................... | A47J 36/12 |
| | | | | 220/573.1 |

* cited by examiner

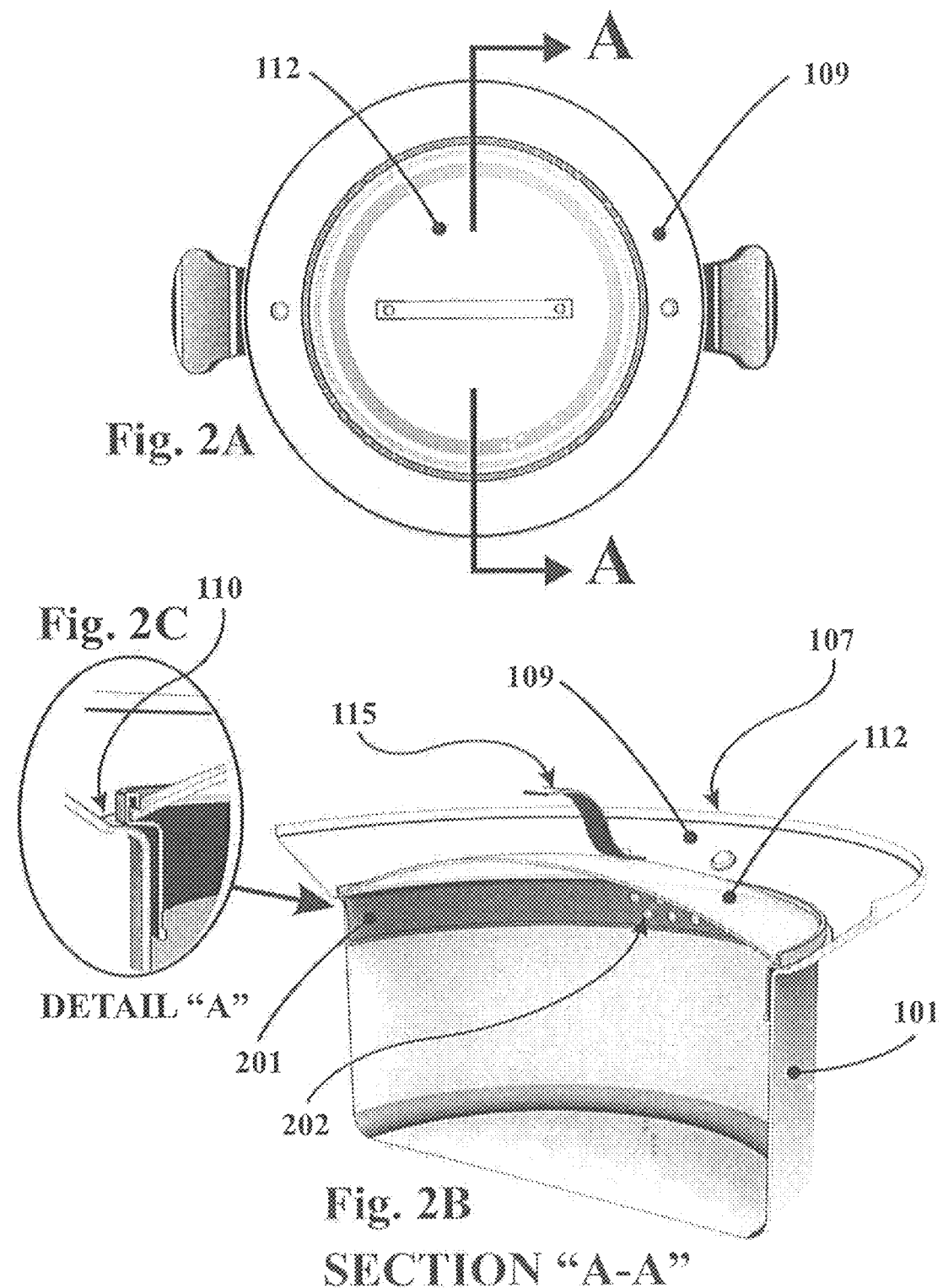

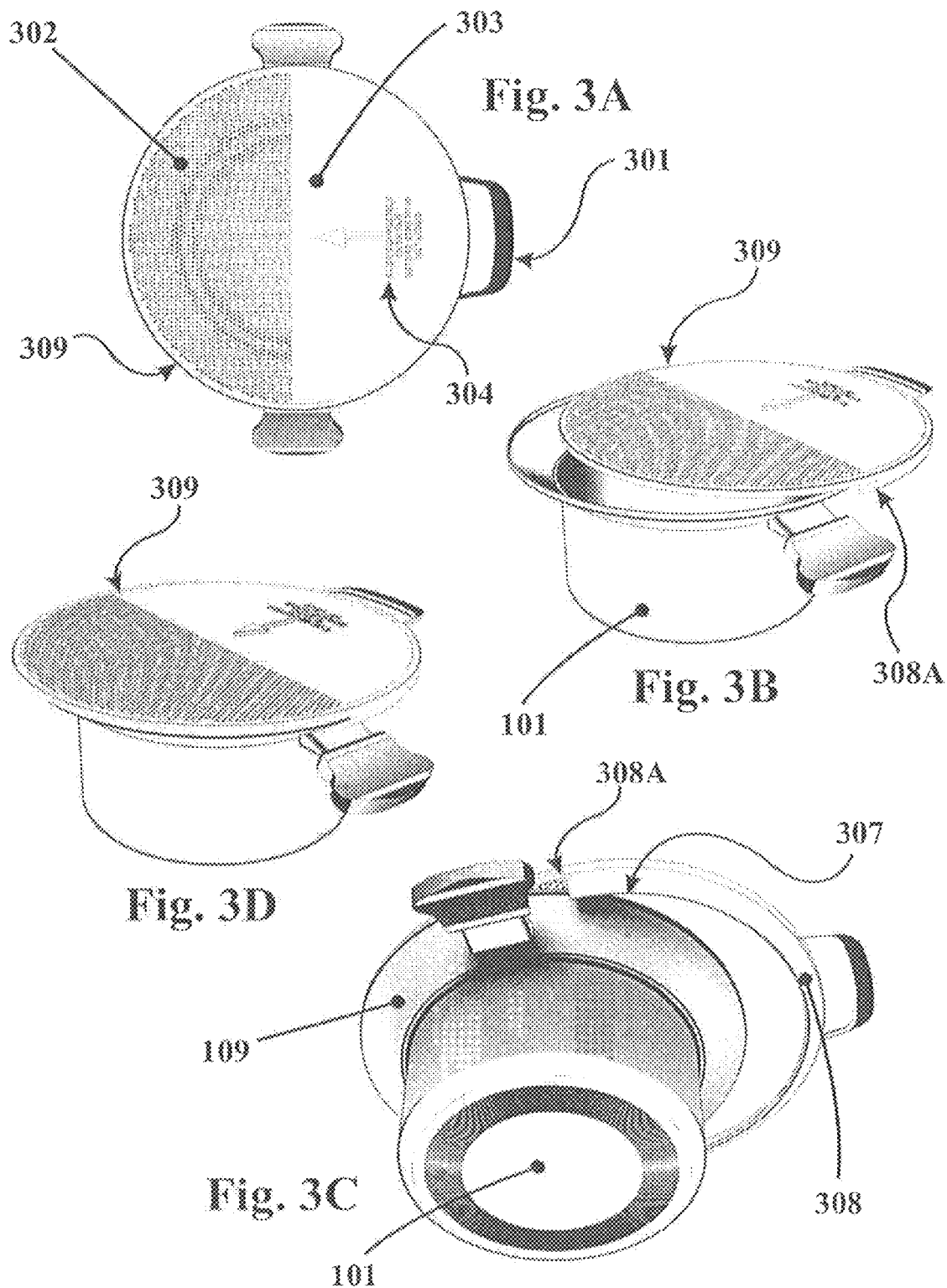

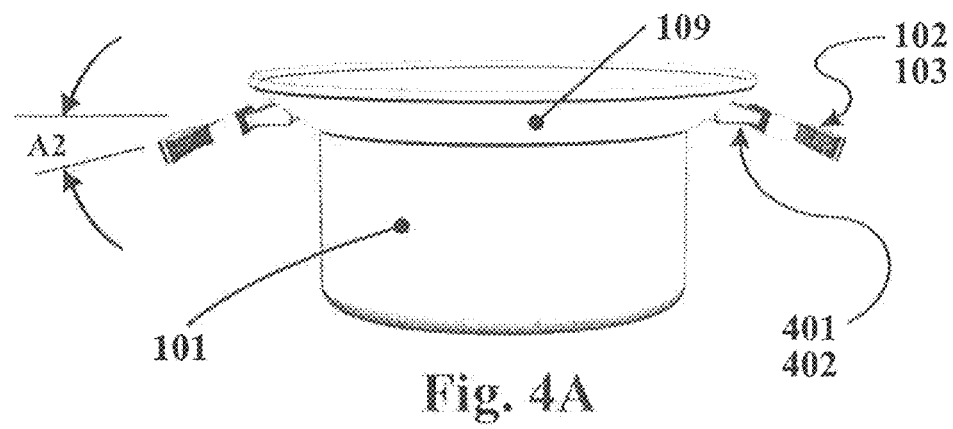
Fig. 4A
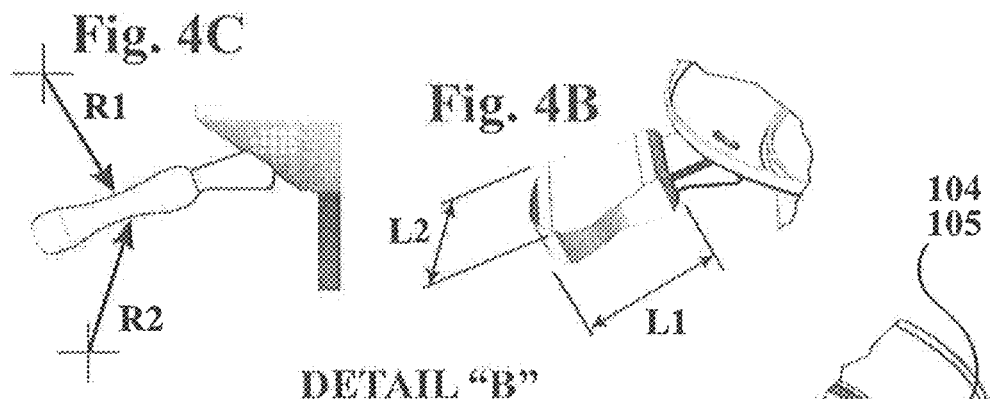
Fig. 4C  Fig. 4B
DETAIL "B"
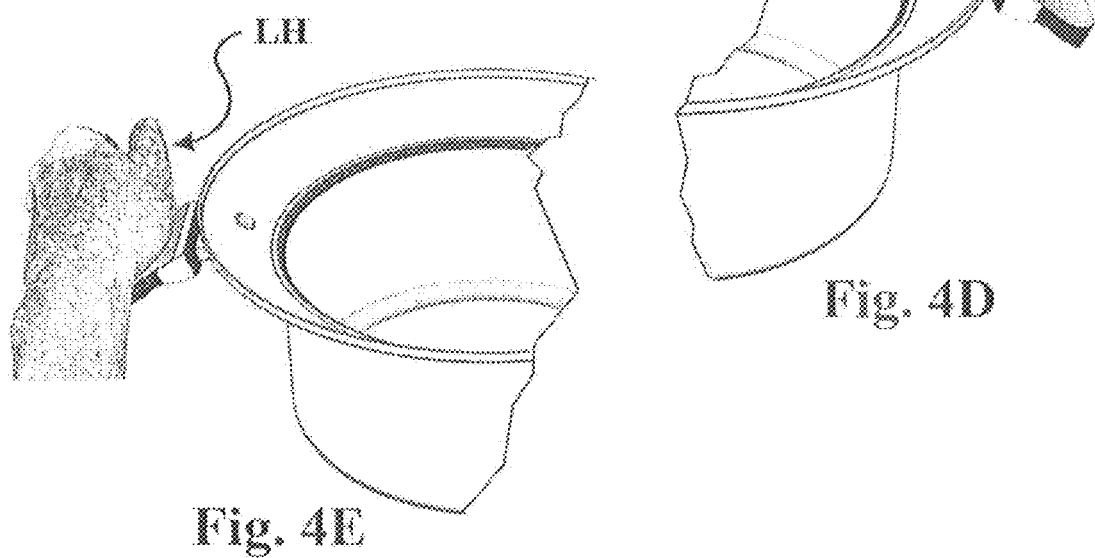
Fig. 4D
Fig. 4E

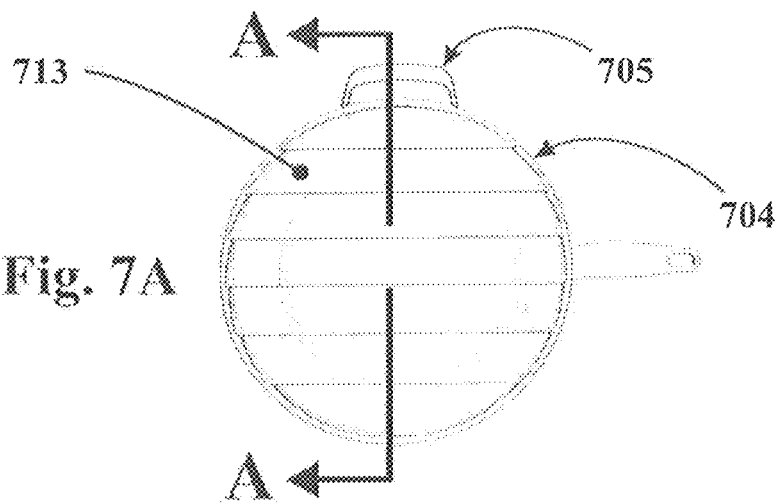
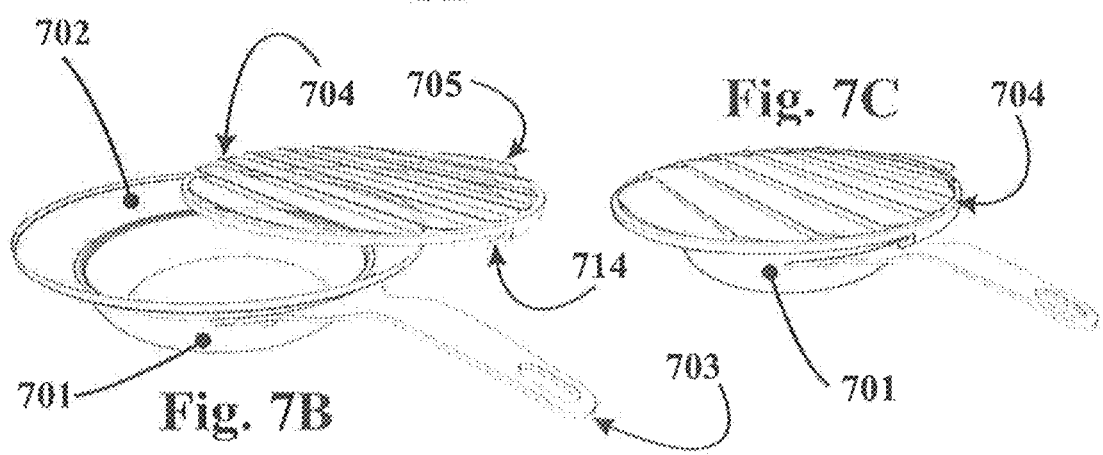
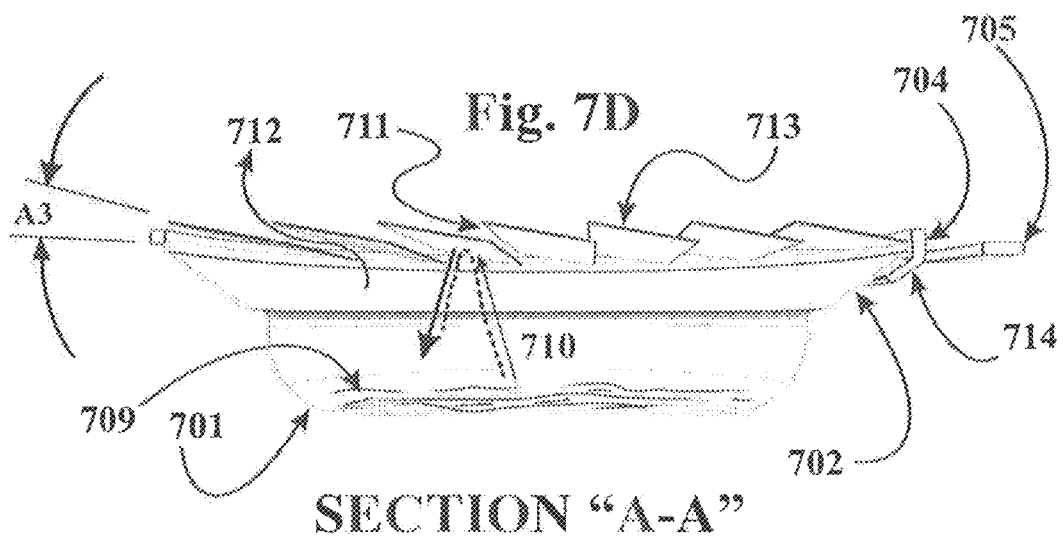

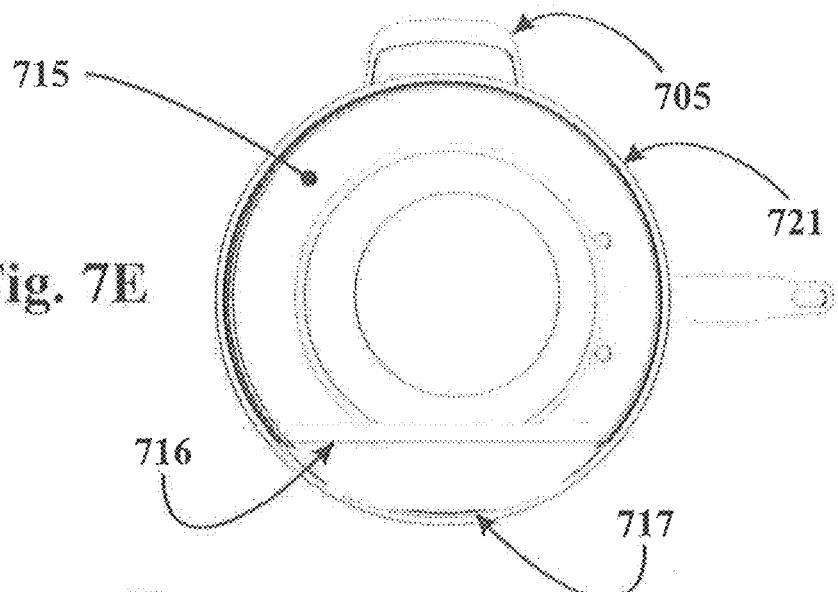
Fig. 7E
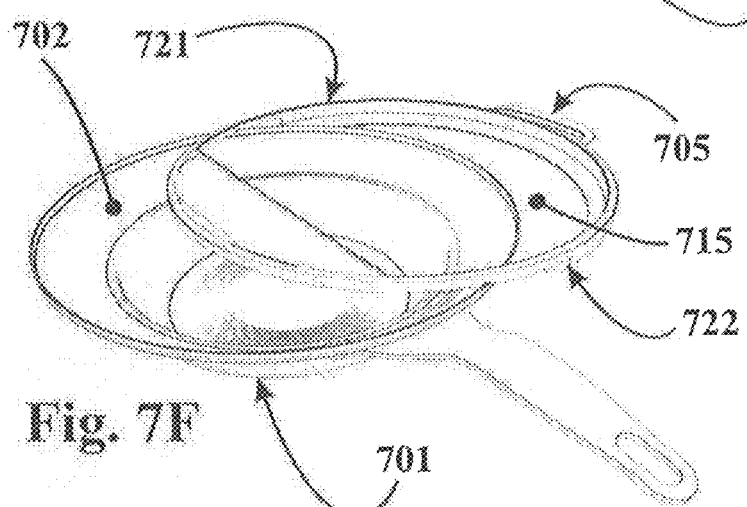
Fig. 7F
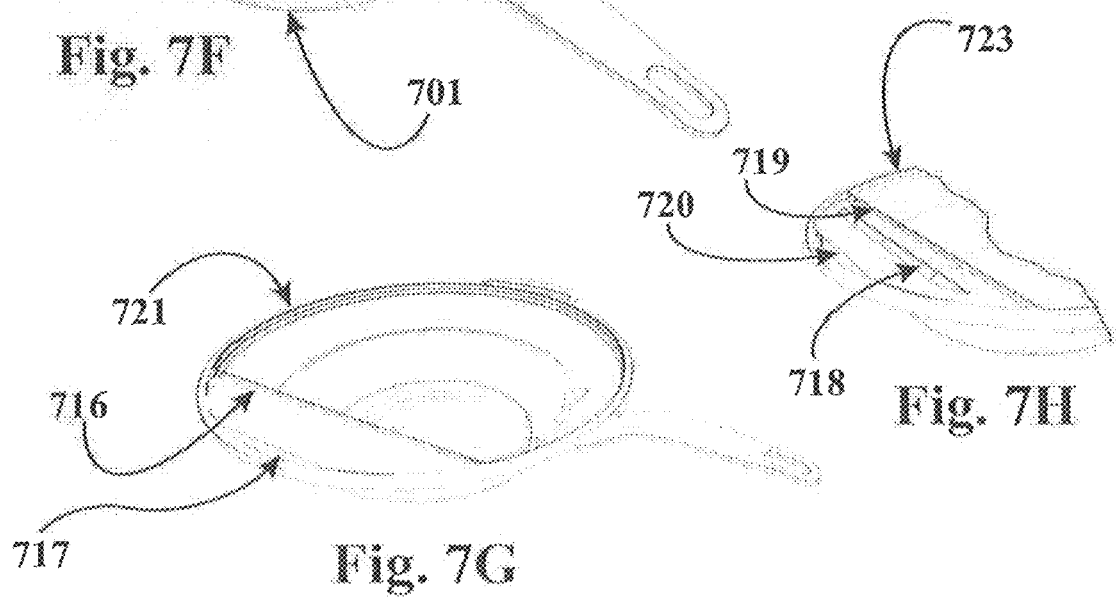
Fig. 7G
Fig. 7H

COOKING VESSEL WITH OR WITHOUT RETAINABLE COVER AND METHOD OF MAKING THE SAME

CROSS-REFERENCE TO RELATED APPLICATIONS

The instant application is a U.S. non-provisional application claiming the benefit of U.S. provisional application No. 62/407,199 filed on Oct. 12, 2016 and U.S. provisional application No. 62/562,819 filed on Sep. 25, 2017, the disclosures of which are hereby expressly incorporated by reference thereto in their entireties.

BACKGROUND OF THE INVENTION

1. Field of the Invention

This invention improves upon the modern cooking vessels and their fundamental operation via one or more user safety features which aims to improve food preparation hygiene.

2. Discussion of Background Information

User safety is aimed at protecting one's body from contacting erratic boiling liquids, unpredictable radial steam discharge and or hot oil splatter. Improved ergonomically designed carrying handles are used for handling control and personal hand temperature protection. An attachable solid to liquid separation device is utilized, which directionally improves food preparation hygiene and general user safety.

A commonly recognized cooking hazard occurs when a heated liquid discharges steam that has been generated from either a non-covered or covered cookware vessel. The radially discharging steam and or spray can lead to serious bodily burns onto anyone in the immediate vicinity of the operating cookware. The steam path is often erratic in direction and unpredictable in volume since it will discharge steam and or spray droplets wherever the cookware lid lifts as pressure builds within the high temperature cooking vessel. Safety awareness will or should occur when the cooking vessel does not have a closure lid in place. The saturation of discharge steam usually comes in direct contact with the cookware's carrying handles.

In addition, recognized food preparation hygiene risk occurs when separating the cooked food from a liquid stock base when using a commercially available free-standing colander. The free-standing colander is ordinarily placed in a sink type vessel, which naturally contains microscopic germs emanating from the waste drainpipe system. The procedure of separating the liquid could easily contaminate the eatable foods if proper care and attention to hygiene are ignored. This occurs when the drained liquid shares the same contact surfaces as the waste drainage line, which will further contaminate the eatable foods in the colander.

An additional cooking safety hazard occurs hot oil in a fry or sauté style pan begins to splatter beyond the cookware's boundary. This occurrence can cause serious skin burns and property damage if not properly controlled.

Prior art documents, which disclose various ways of covering cookware, include U.S. Pat. No. 656,855, U.S. Pat. No. 890,203, U.S. Pat. Nos. 2,428,839, 2,348,452, 4,000,830, 4,590,919.

Such prior art documents generally disclose a cylindrical cooking vessel having either a fixed or removable cover or closure lid. Generally, such lids incorporate a plurality of openings that are intended to vent the produced steam beyond the pots containment area. While these prior art documents all show various ways of controlling the generated steam and releasing it, none of these operate like the invention.

SUMMARY OF THE INVENTION

Embodiments of the invention include an attachable hot oil anti-splatter protection device is utilized that is specific for fry and sauté style pan vessel applications, which are aimed at improving overall user safety and general user functionality.

Embodiments of the invention include several design improvements that will lessen the steam saturation concern and improve the users handling safety when transporting the cookware. The handling improvements will function when the cookware is in either in a hot or cold state.

Embodiments of the invention aim to eliminate the likelihood of cross contaminating the eatable food with the unavoidable sink infested microscopic germs. An additional improvement is aimed at protecting the user's hands from steam mist saturation and hot liquids that are normally associated when using a free-standing colander. The invention described below also directionally improves the user's functionality through improved hand comfort and control when in the process of separating the cookware's liquid base from the eatable reserved food.

Embodiments of the invention include an attachable anti-splatter device that allows the hot pan to vent but eliminates the hot oil from splattering. The device also assists the user when pouring liquid from the cookware into a separate container.

The generalized aforementioned improvements can be incorporated into all commonly recognized cookware such as; stockpot, saucepan, sauté pan, skillet and fry style pans alike. The combined improvements can be applied to all cylindrical or polygonal shaped cooking vessels that are ordinarily used when preparing cooked foods but not limited to only stove top cooking applications. The spirit of this invention can be incorporated into any metallic grade, bi-metallic grade or ceramic composition and coated vessels fabricated through; pattern cast, die-stamping, rolled plate, die-pressed or stage forming techniques. Non-limiting metallic materials include aluminum, copper and stainless steel. These improvements can also be applied to all non-metallic cooking vessels made from; ceramic, stoneware, high temperature plastic or glass grade cooking vessels. These improvements can be directly applied to a range of polygonal shaped cookware vessels having various volumetric sizes to suit; commercial, professional or average consumer grade usages. After attaching the suitable accessory, the collective inventive improvements are achieved without moving parts, or necessary user adjustments.

The aforementioned combined performance, safety and health improvements are directed at cookware that will function seamlessly with an average cooking stove regardless of its dependent energy source. The appliances can broadly range in level of technology advancements and materials from either a low-end household to a sophisticated high-end commercial grade unit. The improvements are not limited to only open style stoves but will effectively work in a closed conventional oven or a fully electric micro-wave oven. Neither does the improved cookware require specialized training or the need of elaborate operational instructions to function.

A number of embodiments are shown in the drawings. These include a first improvement Which is aimed at eliminating the hot steam impingement spray by providing a flared or conical extension located adjacent to the cookware's normal termination rim that also seats the removable cookware lid. The integral conical shaped deflector will prevent hot steam from radially discharging in the general vicinity over the commonly located carrying handles. By default, the conical deflector will collect condensate droplets that will naturally form into a liquid that self-drains into the cookware as the droplets cool to a lower temperature providing fluid flow.

A second improvement is directed to safely handling the cookware when transferring it through the general food preparation area or kitchen. A pair of symmetrically mirrored and angled carrying handles are designed to conveniently engage the underside of one's thumb, which in turn provides improved handling for, dexterity, balance and overall tipping control. The fixed angle provides a comfortable setting for both hand and wrist when grasping the carrying handles. Additionally, the carrying handles are molded from commercially formulated high temperature insulating grade silicon material. The handles fixed attachment location with respect to its physical placement below the vessels conical extension's termination rim, will protect this region from erratic steam and or liquid discharge hazards. A similar styled carrying handle and material will provide comfort and safety for all single handle cookware style vessels as well.

A third improvement is directed at safely separating hot or cold liquids from solid type cooked foods such as: pasta, vegetables, fruits, hard boiled eggs, crustaceous sea food, bones, potatoes and meat stock foods. The food preparer installs an attachable separator device having a conical base, which slides over the vessels conical termination rim. The mating conical geometries engage this attachable device such that it becomes secure when discharging or pouring off the vessels stored liquid contents. The screen is intended to hold back the vessel's contents or retain everything except the liquid. The attachment does not rely on moving parts or require the user's interaction or holding efforts once installed. Said device is slightly larger than the cookware's diameter and minimal in depth. An important benefit of having a device, which attaches to the vessel is directly related to improving overall food sanitary and preparation hygiene. This eliminates the need for the commonly used free standing colander, which is normally placed into a sink type vessel. When used incorrectly, it can easily contaminate the eatable food with microscopic sink and waste drainage borne germs. This occurs when the lowest surface of the colander becomes submerged with the discharging liquid that is in immediate contact with the eatable food and the non-sanitary sink surfaces. An additional benefit is aimed at a separating device that is also compact in size when placing it into an automated dishwasher and onto dry storage. Commonly available free-standing colanders are large in volume and command an equally large physical space for automated dishwasher cleaning and dry storage. Both dishwasher and kitchen utensils storage areas are understood to be premium space in the average household.

A fourth improvement is directed at safety when cooking oil saturated foods or natural fatty meats that require doneness in a fry or sauté style pan vessels. This cooking technique often results in discharging a splatter of hot oil like droplets from the fry pan surface onto and around its immediate vicinity. To avoid skin, burn type hazard that can occur from the hot splatter, a device similar in attachment and design to the liquid separator screen engages with the conical section of the fry pan vessel. Said device will provide a secure attachment for the purpose of blinding the hot splatter and a reliable way of retaining the cooked food when its being poured off or separated from the hot oil. Said accessory is compact in volumetric size for both automated dishwasher cleaning and further dry storage.

A fifth improvement is related to attaching the carrying handles onto the cookware vessel shell. The metallic architecture or support arm, which secures the formed silicon handle to the cookware vessel is secured by a single or sometimes dual press fit metallic rivets. This method of attachment and general technique is common in the cookware utensil industry. The rivet is ordinarily located within the interior surface of the vessel and will come in direct contact with all cooked foods. The material temperature of the rivet is equal to the vessels operating temperature, which coincides with the vessels shell temperature. The radiant temperature is ultimately transferred onto the attached support system. The cookware's overall construction material with either a coated or non-coated internal lining or cooking surface is different than the rivet's material. The non-coated rivet will not function ideally as the non-stick coated vessel's surface. This invention eliminates the radiant thermal and surface coating deficiencies by locating the supporting arm and attachment rivet onto the conical section of any style pan. This improved location will operate at a cooler surface temperature and will not come in direct contact with the cooked foods.

A sixth improvement is directed at the cookware vessel's temporary closure lid. The parabolic shaped closure lid can be fabricated from either, metallic, ceramic, silicon, high temperature plastic, or glass and in either a solid or transparent type material. The circumferential termination mates with an annular metallic skirt having a vertical plane that incorporates a plurality of spaced weep holes. The total area of combined steam weep holes should or can be no more that 1 percent of the skirts total surface area. This ratio will apply to all sized cookware that require a closure lid. The purpose of venting the closure lid along the annular edge will allow the user to select where the discharge steam is better suited for venting towards a stove top appliance draft fan. Said closure lid is ideally designed with a single handle positioned on the lids axial center and highest surface feature.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2A shows a top view of FIG. 1C;

FIG. 2B shows a cross-section of FIG. 2A;

FIG. 2C shows an enlarged portion of FIG. 2B;

FIG. 3A shows a cookware vessel in accordance with the invention and including slide-on sifting cover or lid installed thereon;

FIG. 3B shows the vessel of FIG. 3A with the closure lid partially slid on;

FIG. 3C shows a bottom view of FIG. 3B;

FIG. 3D shows the vessel of FIG. 3A with the closure lid fully slid on;

FIG. 4A shows the cookware vessel of FIG. 1A and illustrates an angular orientation of the handles;

FIG. 4B shows an enlarged portion of FIG. 4A;

FIG. 4C shows an enlarged portion of FIG. 4A with handle dimensions;

FIG. 4D shows a right side of the vessel in FIG. 4A and illustrates the rivet connection of the handle;

FIG. 4E shows a left side of the vessel in FIG. 4A and illustrates how the handle may be gripped by a user's hand;

FIG. 7A shows a top view of another cookware vessel in accordance with the invention. This embodiment is a fry or sauté pan with a splatter lid installed;

FIG. 7B shows the pan of FIG. 7A with the splatter lid partially slid-on;

FIG. 7C shows the pan of FIG. 7A with the splatter lid fully slid-on;

FIG. 7D shows a cross-section of the pan of FIG. 7A and illustrates splatter control action;

FIG. 7E shows a top view of another cookware vessel in accordance with the invention. This embodiment is similar to that of FIG. A except that a drain lid is installed in place of a splatter lid;

FIG. 7F shows the pan of FIG. 7E with the lid partially slid-on;

FIG. 7G shows the pan of FIG. 7E with the lid fully slid-on;

FIG. 7H shows an enlarged portion of FIG. 7G except that a different lid embodiment is utilized. Unlike the single opening/louver lid of FIG. 7F, the lid of FIG. 7H has two louvers and openings;

DETAILED DESCRIPTION OF THE INVENTION

Figure 1A:
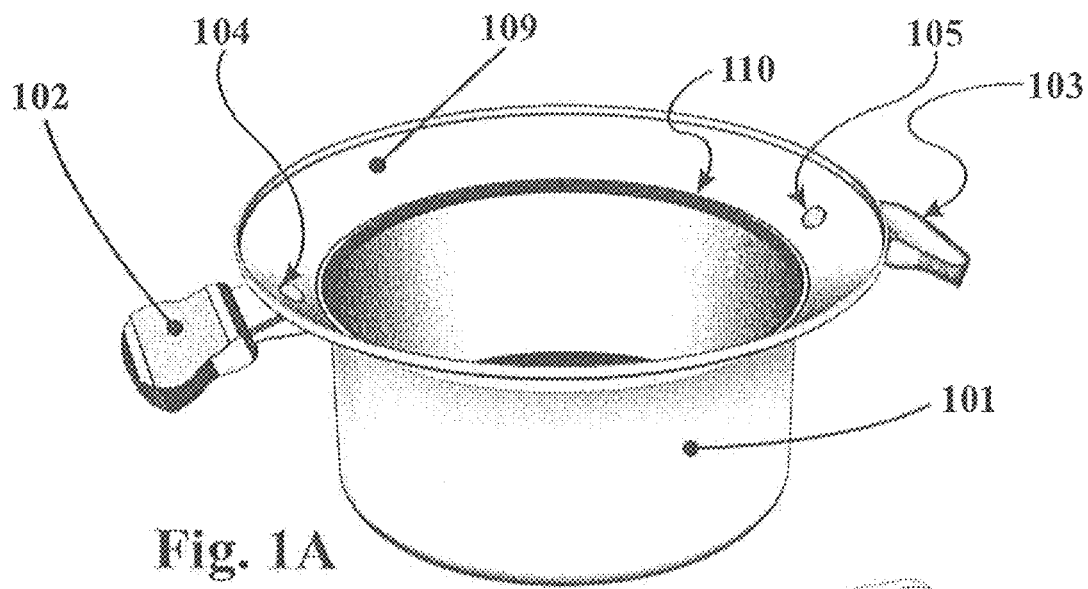
FIG. 1A shows a cookware vessel in accordance with the invention.
Figure 1B:
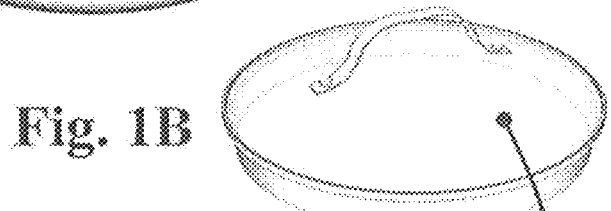
FIG. 1B shows a closure lid in accordance with the invention.
Figure 1C:
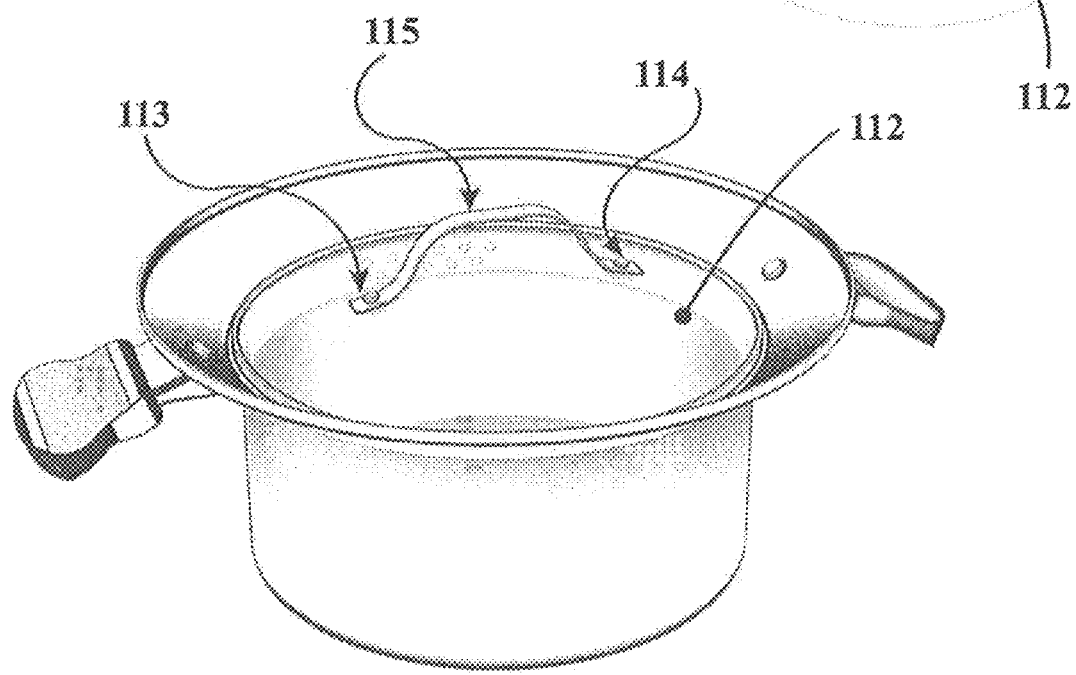
FIG. 1C shows the cookware vessel of FIG. 1A with the closure lid of FIG. 1B installed thereon.

Unless otherwise defined, all design features and descriptive terms used herein have the same meaning as commonly understood by one of ordinary skill in the art to, which this disclosure pertains. Descriptive terms such as; front, top, back, side, bottom, cross-section, perspective, three-dimensional and partial view or section all pertain to the relevant drawing and figure subject views and direct line of sight. The terms are further used to clarify the relationship between the various elements. All referenced or noted dimensions are expressed in English Units.

The referenced embodiments fabrication materials, adhesives, construction assembly procedures, methods and examples thereof are only illustrative and not to be understood as limiting or absolute.

The referenced embodiments consumable cooked and prepared foods and examples thereof are only illustrative and not to be understood as limiting or absolute.

The term as used herein, "architecture" or "architecture geometry" refers to an embodiment's geometric physical parameters as an example thereof is only illustrative and not to be understood as limiting or absolute.

The term as used herein, "cookware", "cooking utensil", "pot", "pan", "stockpot", "saucepan", "sauté pan", "skillet", "frypan" or "vessel" all refers to a device which is commonly used in process of preparing consumable foods. Said device can, in embodiments, be understood to function without; electronic circuitry, electric wires, pressure containment vessels, magnetic flux, stored mechanical energy, stored electric energy and or an electric motor with a coupled mechanized drive train.

The term as used herein "lid" "cookware lid", "closure lid" or "closure cover" refers to a formed architecture from either metallic or non-metallic material having a cylindrical or polynomial shape, which is loosely located onto the top surface of the described embodiment. Said element is located concentrically to the embodiment's center axis.

The term as used herein "conical", "conical extension", "deflector" or "conical deflector" refers to the uppermost area of the described embodiment that functions as a steam and/or condensate collector. Such extension is ideally located concentrically to the embodiment's center axis and not to be understood as limiting or absolute.

The term as used herein "rim" refer to a circular region, which is normally concentric to a circular embodiment that shares the same axial location.

The term as used herein "pour", "pouring", or "pour location" refers to any plural or singular word combination thereof, which defines the available locations on the conical extension to drain stored liquids from within the described embodiment.

The term as used herein "handle", "mirrored handle" or "carrying handle" refers to any plural or singular word combination thereof, which defines an element or location on the outermost perimeter of the described embodiment that is used for hand-held movement thereof.

The term as used herein "rivet" refers to a single fastener that joins several independent components without the need of ferrous welding, glue bonding or machine thread series with additional mating fasteners. Joining is achieved by pressing and deforming the rivet's metallic architecture, which this invention represents in its entirety.

The term as used herein "stove", "stovetop", "hot plate", "cooking surface", "range", "induction cooktop", "oven" or "microwave oven" all refer to commonly known apparatuses used in preparing consumable foods by a person skilled in the art. Such devices are capable to develop a temporary heat source ranging from ambient temperature to 700 degrees Fahrenheit. Such devices are not limited to developing exothermic energy from just. Solar, electric, propane, natural gas, other commercially available petrochemical derivatives can also be used.

The term as used herein "cook", "to cook", "cooked", "cooking" or "cooking process" refers to the act of a person skilled in the art of preparing food for consumption of, which this invention represents in its entirety.

The term as used herein "eatable", refers to the final product after preparing food for consumption of, which this invention represents in its entirety.

The term as used herein "user", "user's" or "end user" refers to a person skilled in the art of preparing food for consumption of, which this invention represents in its entirety.

The term as used herein "kitchen", "sink", "sink type vessel", "wastepipe", refers to the location and/or a recognized appliance that is commonly used by a person skilled in the art of preparing food for consumption of, which this invention represents in its entirety.

The term as used herein "steam", "steamed" refers to the science of transforming an ambient temperature liquid to a vaporized mist when it reaches a higher temperature.

The term as used herein "condensate" refers to the scientific reaction of transforming a high temperature vapor mist to a minuet liquid droplet when it transforms to a lower temperature such that it can be collected in a fluid state.

The term as used herein "handling" refers to when the apparatus is controlled by combined movement and pivot ability by the user's hand skills. Said hand is understood to include; fingers, thumb, palm and wrist without limiting its dexterity or range of motion. Said apparatus is designed for ambidextrous use.

The term as used herein "liquid weep" refers to an annular location, which is concentric to the described embodiment's center axis and its elevation is located below the conical deflector.

The term as used herein "stream" refers to a fluid being transferred through the apparatus at a specified entrance and will exit through a specified discharge location.

The term as used herein "tempered" or "tempered liquid" refers to a desired liquid temperature range that could be less than, equal to, or greater than an ambient temperature.

The term as used herein "plural", "plurality" or "in plurality" refers to a desired quantity of more than one when referencing a specified item.

The term as used herein "upright" or "natural orientation" refers to the natural operating orientation of the described embodiment. This position is understood to be when the embodiment is actively working or when being transported with contained liquid or food like products.

The term as used herein "tip", "tip over", or "tipping" refers to one of the hand-held positions when transferring liquid contents from the described embodiment to an alternate location. This position is understood to be when the carrying handles are other than parallel to the food preparing work surface.

The term as used herein "separator", "separation device" or "separator device" refers to the ability to separate a multiphase stock comprising of liquid and solid particles by poring through a flat perforated partition.

The term as used herein "splatter", "oil splatter". "oil splatter droplets" or "hot oil" refers to the post effect of cooking food with food grade oil, fatty meats or oil producing vegetable's that have reached a point of self release created by vessel temperature. In result an array of micro sized droplet emit in an explosive direction, which is often away from the interior of the hot cookware vessel.

The term as used herein "anti-splatter", refers to a device that is intended to eliminate the personal and property hazards associated to hot oil splatter.

The term as used herein "colander" or "free standing colander" refers to a commercially available kitchen utensil, which separates a liquid from a solid by poring through the standalone perforated hemispherical device.

The term as used herein "engage", "engaging" or "engagement" refers to the physical method of temporarily locking dissimilar items together without tools or force, so they can function in unity.

The term as used herein "disengage", "disengagement" or "disengaging" refers to the physical method of separating a pair of dissimilar items without the need of tools or unusual force.

The term as used herein "silicon" refers to a composition of polymers that can be molded to a specific shape for the purpose of insulating the elevated surface temperature at its connection. The purpose is that silicon shape can be touched without common hand protection.

The term as used herein "coat", "coating" or "coated surface" refers to a commercially available composition that is ordinarily applied to the inner surface of most cookware.

The term as used herein "microscopic germ" refers to harmful bacteria that grows within the inner surface of common waste water drainage systems.

The term as used herein "hygiene" refers to measures taken to promote general cleanliness through an improved cookware utensil, which is aimed at preventing harmful bacteria from contaminating eatable foods that are being prepared. This safety measure demonstrates a method of which this invention represents in its entirety.

The present invention will be described in further detail with referenced FIGS. 1A to 8B. All herein disclosed ranges (including angles) can include individual or fractional percentages or values encompassed thereby such that a range of 1 to 10 would include both values such as 2 or 6, as well as the values 2.1 or 6.7, for example.

Referring initially to, FIG. 1A is a three-dimensional view of a cookware embodiment. The cookware's main architecture or body 101 can be of all geometric shapes but is advantageously circular in cross-sectional shape and generally cylindrical in extent. Handle assemblies 102 and 103 can be attached to the body 101 through commercially available fastening techniques such as press fit rivet fasteners 104 and 105. The example shown in FIG. 1A shows a cookware vessel having a pair of mirrored (arranged 180 degrees apart) carrying handles. A conical deflector section 109 is arranged an upper end of the body 101 (opposite the closed bottom end) and is oriented at a preferred angle of about 35 degrees measured from a horizontal plane or a bottom of the container. This angle can also be any angle between 25 to 50 degrees, so as to accommodate a range of geometric style cookware shapes and volumetric capacities. An annular surface 110 which allows a seating of a lid cover 112 (see FIG. 1B) can have a larger outside diameter than the cookware's inside diameter. The cover 112 shown in FIG. 1B can have an outside diameter equal or slightly less than the cookware's inner diameter measured at the highest elevation of the body 101. The annular surface 110 is ideally generally parallel to the cookware's bottom surface (so as to define a generally cylindrical sidewall) but can taper upward from 0 to 20 degrees towards the cookware's center axis, whereby any liquid that settles on the surface 110 can readily drain (via gravity) into the vessel. Surface 110 smoothly intersects a conical surface of the section 109 such that any collected food debris or fluid residue given off during cooking can self-drain, in the section 109 as well as the section 110, into cookware internal space without obstructions. The section 109 can have a highest elevation that terminates in a smooth edge to avoid personal handling injuries. A three-dimensional view of the vessel and lid in an assembled state is shown FIG. 1C, which illustrates closure lid 112 in an installed position and having a single handle 115 attached to the lid 112 with press fit fasteners 113, and 114. The section 109 extends to a generally cylindrical lip 107 that can be generally oriented parallel to a center axis of the vessel sidewall 101.

FIG. 2A shows a top view of the cookware with cookware closure lid assembly 112 installed. As should be apparent, the conical section 109 concentrically surrounds the cookware body in its entirety. As shown in FIG. 2B, the section 109 extends to the protruding portion 107. As is also apparent from FIGS. 2B and 2C, the closure lid assembly 112 has an annular skirt 201 that includes a series of vent holes 202 that can have an opening area equivalent to 1% of the skirt 201. Closure lid assembly 112 can have a single handle that is centrally positioned. As is also apparent from FIG. 2C, an annular rim area 108 can be disposed between the section 109 and the upper end 110 of the sidewall. A main purpose of the rim area 108 is to support the closure lid assembly 112.

Closure lid 112 can be fabricated with an acceptable metallic material and grade commonly used in the cookware and utensil industry. The most preferred material is non-metallic clear ceramic, which can be formulated from compositions used in the cookware and utensil industry. Closure lid 112 can have an acceptable wall thickness of 0.0625 inch, a preferred wall thickness between 0.0625 and 0.375 inch and a most preferred wall thickness of 0.125 inch in either metallic or non-metallic materials. Annular skirt 201 can have an acceptable wall thickness of 0.003 inch, a preferred wall thickness between 0.03 and 0.1 inch and a most preferred wall thickness of 0.0625 inch. Annular skirt 201 can be fabricated with an acceptable metallic material and grade commonly used in the cookware and utensil industry.

Now referring to FIG. 3A, one can see how the cookware described previously can be used with a flat separator lid 309 which can be slid-on in a direction perpendicular to a center axis if the sidewall. The lid 309 can be slid on to a certain extent without engaging with the section 109 in a non-releasable manner and, after a certain point, will gradually engage more and more of the section 109 until it becomes fully non-releasably secured to the cookware. A perforated area 302 of the lid 309 is defined by about 50% of the entire cross-sectional area, such that the lid 309 can be said to have about 50% open area. The openings of the open area 302 can be in the form of plural about 0.06 inch (or 1/16 inch) diameter through holes. These holes can be uniformly broadcast throughout in a consistent pitch pattern (and/or generally equally spaced from one another). The closed or non-perforated portion 304 can be designated as a blind flow area, i.e., non-transparent or non-translucent A flat viewable surface of area 303 can include information that is e.g., permanent relief text, and can have the form of operator instruction and/or an advice statement. The separator 309 is hand-installable and can be advantageously be provided with a unidirectional and centrically located handle 301. FIGS. 3B and 3C show an initial sliding-on of the separator 309 onto the cookware 101. FIG. 3D shows the final installed position of the separator 309 with the cookware vessel. As should be apparent, in this position, the semi-circular retaining flange 308 of the lid 309 non-releasably engages with the section 109. The flange 308 only extends about half-way around the lid 309 and is defined by two opposite ends 308A. The angular spacing between the two ends 308A can be about 180 degrees and is preferably between 170 and 180 degrees. The flange 308 is angled with an angle that is generally complementary to the angle of the section 109.

Separator 309 can have an acceptable wall thickness of 0.0625 inch, a preferred wall thickness between 0.0625 and 0.375 inch and a most preferred wall thickness of 0.125 inch. The monolithic architecture can be molded from an acceptable high temperature grade non-metallic material commonly used in the cookware and utensil industry.

Now referring to FIGS. 4A-4C, one can see the position and orientation of the handles 102 and 103 which can be of molded silicon. The handles 102 and 103 include inner metallic support arms 401 and 402 which are attached to conical section 109. Each handle can be oriented at an angle A2 that is about 20 degrees measured from a horizontal plane. This angle A2 can range between 25 and 15 degrees. FIG. 4D illustrates one acceptable location for fastener rivets 104 and 105. FIG. 4E illustrates how a left-hand LH can comfortably grasp the support handle. FIGS. 4B and 4C show preferred dimensions that define the silicon formed handle for ideal comfort, hand grasping and lifting control with L1 being about 2 inches, L2 being about 4 inches and with radius R1 being about 6 inches and radius R2 being about 6 inches. In embodiments, these dimensions can deviate by up to 5% in either (+) or (−) of any value. The lifting handles can alternatively be attached to the vessel by traditional metallic weld techniques instead of fastener style rivets. In addition, the lifting handles 102 and 103 can have dimensional parameters that are proportionally scaled to the cookware vessel, which in the illustrated example is a vessel with 9 inch inside vessel diameter.

Figure 5A:
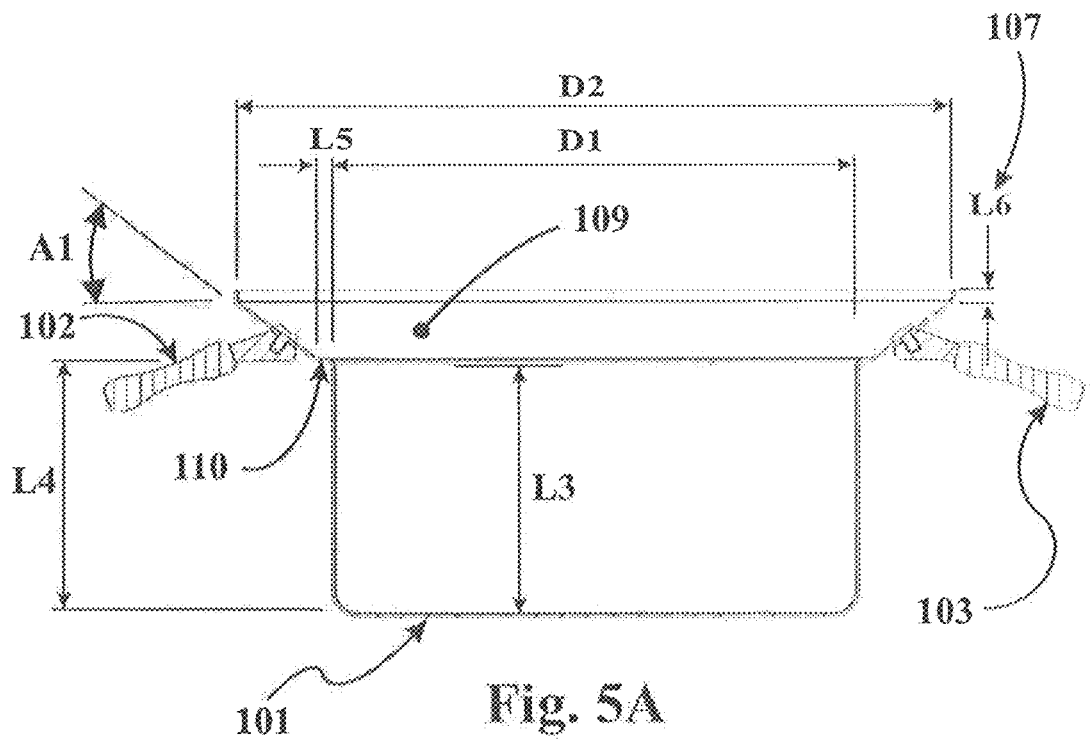
FIG. 5A shows a cross-section of the cookware vessel of FIG. 1A and illustrates various dimension features.

Referring to FIG. 5A, one can see exemplary geometric dimensions for the cookware vessel 101. The value L3 defines the cookware depth, whereas the value D1 defines the cookware inner diameter. The value D2 defines the conical section inside diameter as well as an inside diameter of the protruding portion 107 while the value L4 defines the midpoint elevation of handle assemblies 102 and 103 and the annular portion 110. The value L5 defines the surface width of rim area 110. The length L6 defines the depth or axial length of the conical termination lip or protruding portion 107 and the value A1 defines the preferred angle of the integral conical section 109.

Non-Limiting Pasta/Sauce Pot Example

The following dimensional values are for an exemplary 5 quart pasta/sauce pot;
For example, if D1 is equal to 9 inches, the following values in relation to D1 can be:
L3 can be between 50 and 70% smaller than D1 but could also be between 55 to 65%, and is preferably 60% smaller. L3 can be the same as L4 and can also be 5 to 10% smaller than L4.
L5 can be between 1 and 3% of D1 and can also be between 1.5 to 2.5% of D1 with 2% smaller being preferred.
L6 can be between 1 and 3% of D1 with between L5 to 2.5% being preferred and with 2% smaller be most preferred.
D2 can be between 9 and 19% of with 12 to 16% being preferred and with 14% larger be most preferred.
A1 can be between 25 and 50 degrees with 30 to 45 degrees being preferred and with 35 degrees be most preferred.
The above dimensions are adjustable to reflect value D1 for alternate sized cookware. In the example shown the value for D1 is only illustrative and not to be understood as limiting or absolute.

Figure 5B:
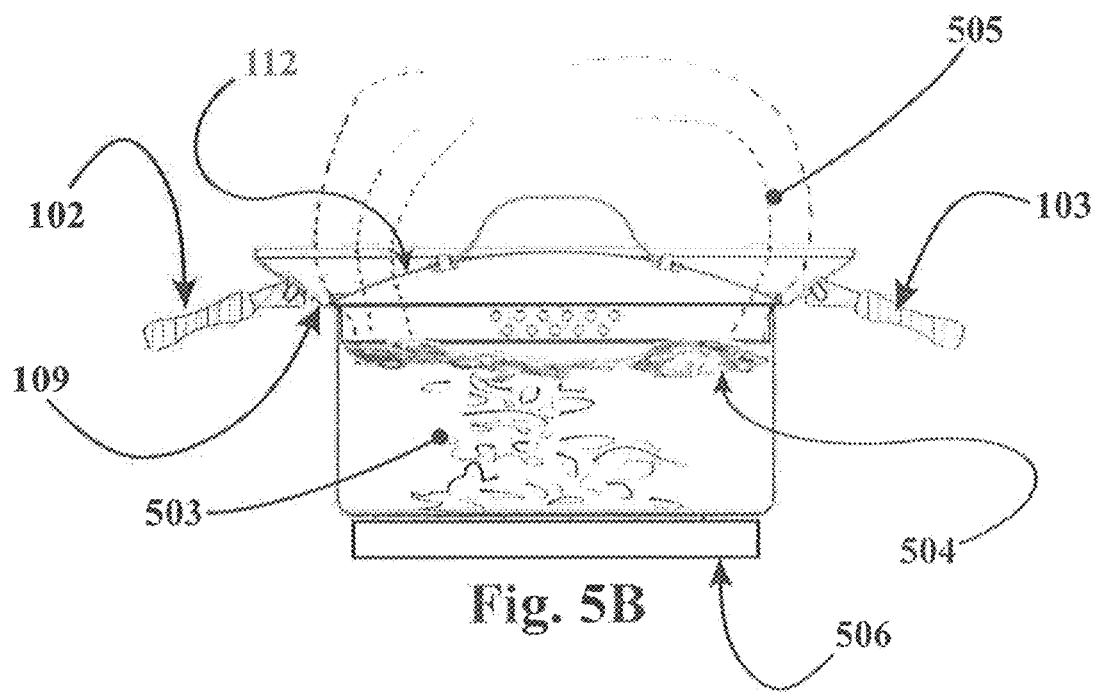
FIG. 5B shows a cross-section of the cookware vessel of FIG. 1C arranged on a cooktop and illustrates boiling in action.

FIG. 5B illustrates an exemplary vessel experiencing a two-phase rapid water boil between 203-212-degree F. as the liquid converts to saturated steam which can then condense. Element 506 refers to a common heat generating source such as a gas range or electric stove top, whereas element 503 relates to formed air pockets, which travel in a vertical path through the liquids profile. Element 504 refers to the rapid liquid boil elevation and element 505 refers to the generated lift steam path as it exits around the closure lid 112 and travels above the cookware's termination rim. Lifting handle assemblies 102 and 103 are shielded from direct impingement of hazardous steam lift 505 by conical shape 109. Conical section 109 will function as a heat sink such that it ultimately operates at a much cooler temperature opposed to the higher temperature of elements 503 and 504. Indeed, the nature of the conical or tapered section 109 is such that whereas the temperature at a lowest and smallest diameter of the section 109 or at the top of the body 101 may be too hot to handle, the temperature of the section 109 will decrease as the diameter of the section 109 increases to an extent that a temperature nearer the portion 107 may not be so great as to be safely handled even when the vessel is at full boil. Indeed, the temperature along the section 109 can vary significantly so as to be, e.g., 50 or more degrees F. cooler near portion 107 compared to an area near section 110. This prevents boil over and allows the handles to be cooler as they are coupled to a cooler section 109. Cookware vessel 101 can have a preferred shell thickness of 0.0625 inch, and can have a shell thickness between 0.0625 and 0.375 inch and an acceptable shell thickness of 0.125 inch. The vessel can be fabricated with an acceptable metallic material and grade commonly used in the cookware and utensil industry.

Figure 6A:
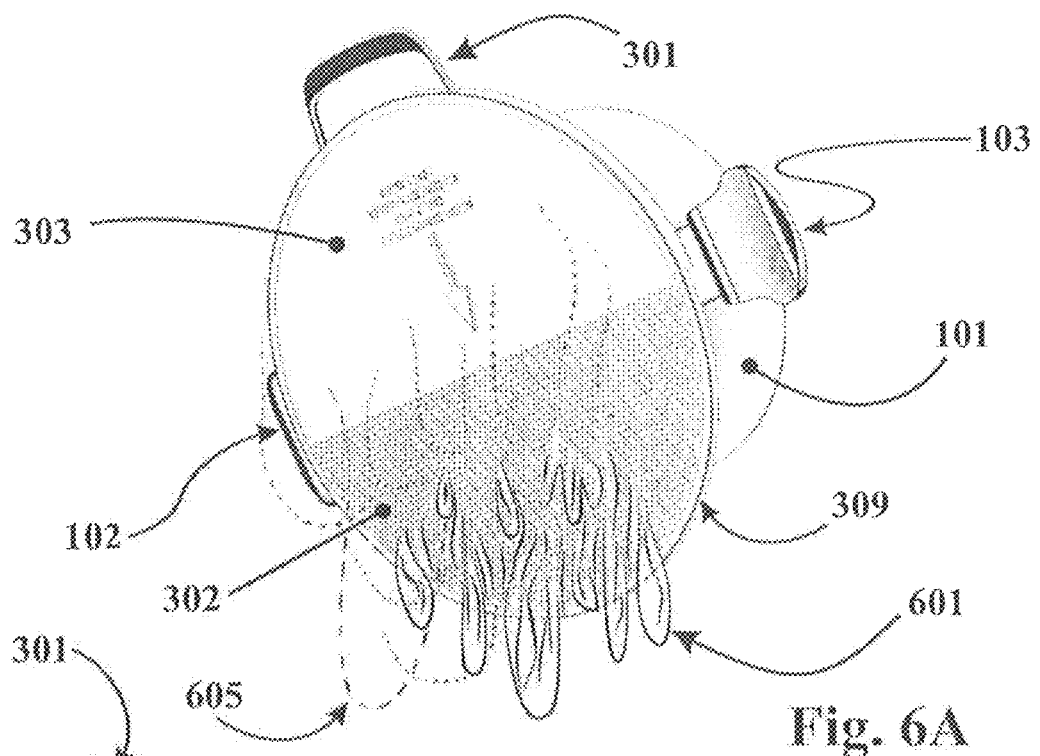
FIG. 6A shows the cookware vessel of FIG. 3A and illustrates draining or sifting action.
Figure 6B:
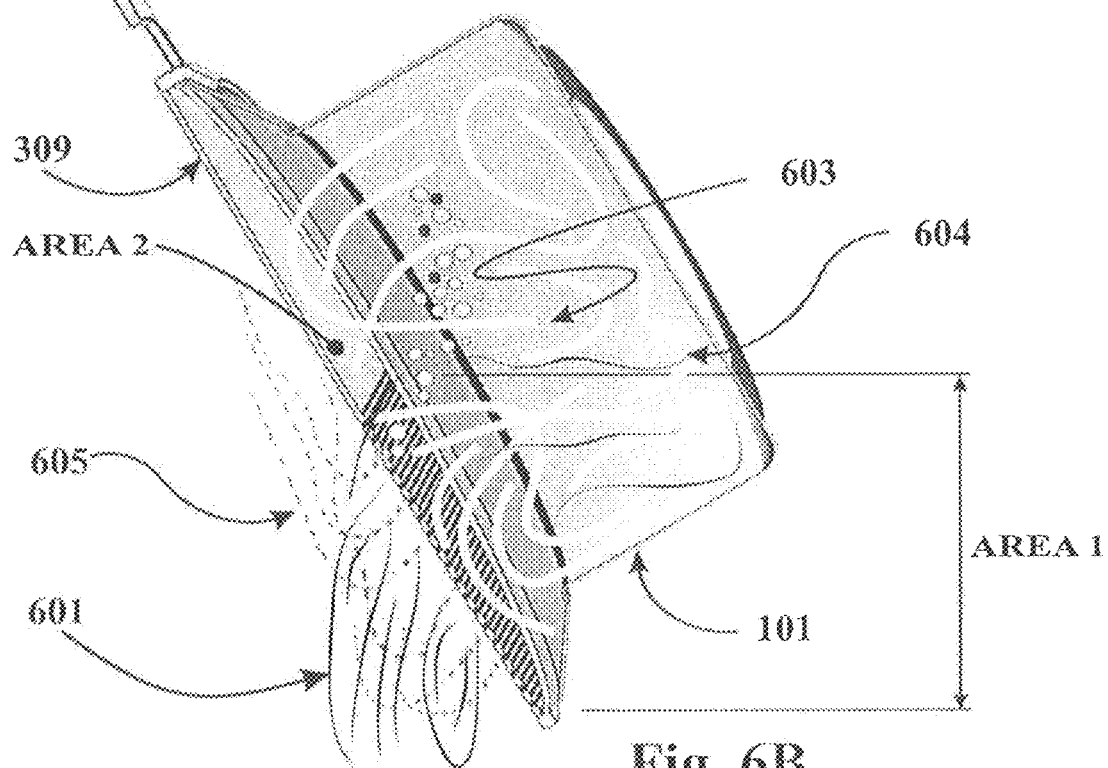
FIG. 6B shows a cross-section of the cookware vessel of FIG. 6A during draining or sifting action of cooked pasta.

Referring to FIG. 6A, one can see the previously described vessel shows in FIG. 3A can operate in a three-phase separation process. The separator 309 has a perforated area 302 that allows a phase-1 liquid 601 to exit the enclosed cookware cavity through the defined openings while blocking the passage of cooked items such as pasta. The location of the support handles 102 and 103 can be oriented as shown so as to facilitate the illustrated pouring position. The separator handle 301 can be orientated at the highest elevation to ensure that the separator device 309 is engaged in a safe locked position. This locking engagement is the result of having the mating conical geometries (of flange 308 with section 109) nest to each other. This locking engagement can be seen in FIG. 6B which illustrates the phase-1 liquid 601 escaping through the perforations defined in "Area 1". Element 604 defines the highest liquid elevation and element 603 defines a phase-2 substance, which is a typical food such as pasta noodles—these are being strained from the liquid base stock. Area 2 functions as a flat baffle and is intended to gather solid food but allows the liquid to self-drain to the perforated Area 1. Separator handle 301 functions to allow the securing of the separator device 309 onto cookware vessel 101 by engaging the mating conical geometries as shown in FIG. 6B. Element 605 depicts a phase-3 lift steam that will pass through the perforated area in the manner shown. Both lift steam and discharge liquid will ideally not come in direct contact with the hand holding assemblies 102 and 103, which offers a safety benefit. The practical functionality of having the separator 309 attach to the cookware illustrates the aforementioned benefits of improved food preparation hygiene. With the system shown in FIG. 6A, one can more safely pour off the liquid waste contents into a sink vessel with less risk of contamination that with prior art devices.

Now referring to FIG. 7A, there is illustrated a pan and an anti-splatter shield 704 in the engaged position when fully attached to the fry pan or a similar style vessel. The pan has a body 701, a conical flange 702 and a handle 703. The shield 704 has a plurality of fixed louvered panels 713 (see FIG. 7D) which allow the stored heat and some vapors to escape through rectangular gaps 711. The escaping heat path 712 can be seen to move through the gaps 711 in FIG. 7D. The fixed panels are intended to serve as blocking devices that will retard all upward moving oil splatter droplets from escaping beyond the vessels overall boundary. Each panel is angled and oriented from the horizontal plane by angle A3. The panels can or should be arranged such that angle A3 is between 1 and 34 degrees, or between 5 to 15 degrees, with 10 degrees be most preferred. Hot oil or natural food fats 709 can formed on the vessels interior surface. As the cooking temperature increases, the oil expands and forms an array of micro droplets that generate self-inertia. This phenomenon creates an array of hot oil splatter that moves in a largely upward direction. The splatter path 710 can be affected by the panels as shown in FIG. 7D. The configuration of each panel should be that they overlap an adjoining panel, which is intended to prevent the droplet splatter from traveling through gap 711.

The anti-splatter apparatus or shield 704 preferably has a unidirectional and centrically located handle 705. The handle is purposely located such that one's hand does not travel above the hot vessel for either installing or removing the same, FIG. 7B shows partial engagement/installation between the shield 704 and the cookware vessel 701. The lower conical rim 714 of shield 704 will engage with the vessel's conical section 702. The lid to conical section non-releasable connection operates in a similar fashion to the previously mention separation 309. FIG. 7C shows the shield 704 when fully slid onto cookware 701. The anti-splatter device 704 can be quickly installed onto the vessel at any convenient radial location. This provides optimal handling balance, pouring control and general safety for all right or left-handed users. The resulting combination of functionality and safety occurs as follows. The liquid contents of the vessel can be neatly poured into a separate container by tipping the cookware vessel with single handle 703 such that handle 705 becomes elevated above the natural pivot point of handle 703. In result, the lowest open louver positioned directly opposite handle 705 will also serve as a vessel drainage port. The remaining rows of adjacent louvers 713 will function in unison when pouring a large volume of liquid to achieve an increased flow rate. Another feature of the device 704 is that it allows ingredients to be added through the open spaces, if necessary, preventing the need to remove the device 704.

The anti-splatter device 704 can be fabricated preferably from a transparent material such that the eatable foods can be viewed during the cooking process when the device is in place. This device can also be fabricated from non-transparent materials, which will not hinder or deviate from the expressed functionality, performance or safety enhancements, which this invention represents in its entirety. Anti-splatter device 704 can also be fabricated with a combination of high temperature grade plastic, metallic and clear ceramic grade materials commonly used in the cookware and utensil industry. The most preferred material combination is a metallic or high temperature grade plastic section 714 joined with non-metallic clear ceramic or translucent high temperature plastic louvers 713. Components 704 and 713 have an acceptable wall thickness of 0.0625 inch, with a range of the wall thickness being between 0.0625 and 0.375 inch and with an exemplary wall thickness of 0.125 inch in either metallic or non-metallic materials.

FIG. 7E shows an alternate anti-splatter shield 721 having a single flat solid surface 715, which has a surface area that, in embodiments, is not greater than 95% of the total open cross-sectional inside area of the shield 721. The minimal surface area should not be not less than 20% of the total open cross-sectional inside area. A preferred range of coverage can be between 80% to 90% of the total open cross-sectional inside area of apparatus 721. The material of section 715 can be high temperature grade clear or solid plastic, solid metallic plate or clear ceramic grade materials commonly used in the cookware and utensil industry. FIG. 7F shows a partial engagement/installation between the shield 721 and the cookware vessel 701. The lower conical rim 722 of apparatus 721 will engage with the conical section 702 when fully installed and will be non-releasably secured in a manner similar to the previous embodiments with section 722 engaging with conical section 702. FIG. 7G shows a configuration wherein the shield 721 has one heat vent 716 and one liquid drain port 717. On the other hand, FIG. 7H shows a configuration wherein the shield 723 has two-heat vents 718 and 719 and one-liquid drain port 720.

Non-Limiting Fry/Saute Pan Example

Figure 8A:
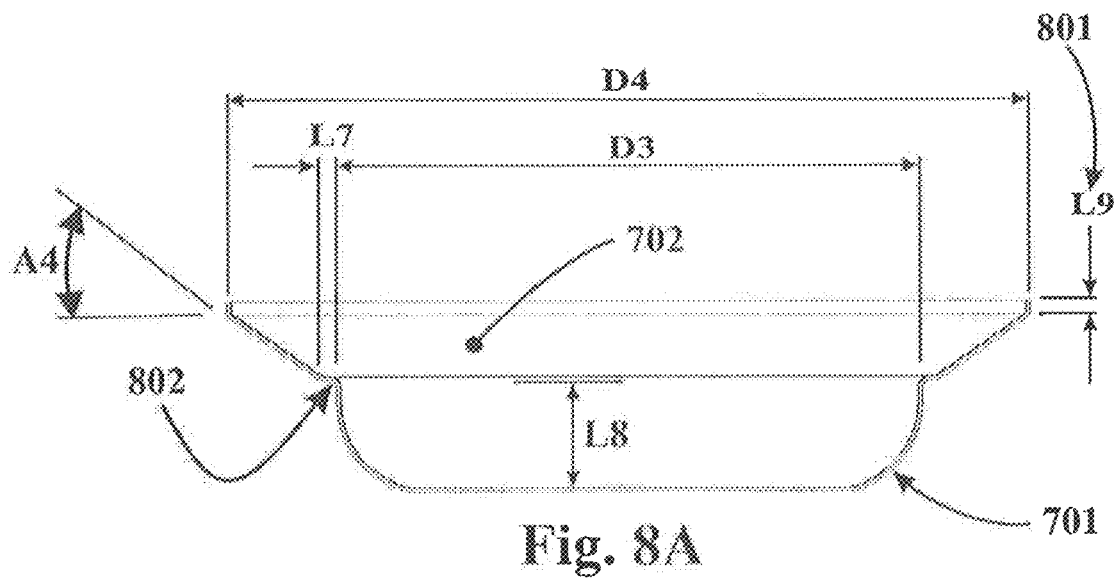
FIG. 8A shows a cross-section of the pan of FIG. 7A without any lid installed and illustrates various dimension features.

FIG. 8A shows geometric dimensions of a fly pan vessel 701 with value L8 defining the cookware depth. Value D3 defines the cookware inner diameter and value D4 defines the integral conical section inside diameter. The value L7 defines the surface width of rim 802. The length L9 is that of protruding portion 801 which defines the depth or axial length of the same. The value A4 defines an angle of the integral conical section 702.

The following dimensional values are defined as such for an exemplary fry pan; For example, if P3 is equal to 9 inches, the following values in relation to D3 can be:
L8 can be between 70 and 90% smaller than D3 with between 75 to 85% being preferred and with 80% smaller be most preferred. A non-limiting example would be 1.75 inches for value L8.
L7 can be between 1 and 3% of D3 with between 1.5 to 2.5% being preferred and with 2% smaller be most preferred.
L9 can be between 1 and 3% of D3 with between 1.5 to 2.5% being preferred and with 2% smaller be most preferred.
D4 can be between 9 and 19% larger than D3 with 12 to 16% being preferred and with 4% larger be most preferred.
A4 can be between 25 and 50 degrees with 30 to 45 degrees being preferred and with 35 degrees be most preferred.
The above dimensions are adjustable to reflect value D3 for alternate sized cookware. In the example shown the value for D3 is only illustrative and not to be understood as limiting or absolute.

Figure 8B:
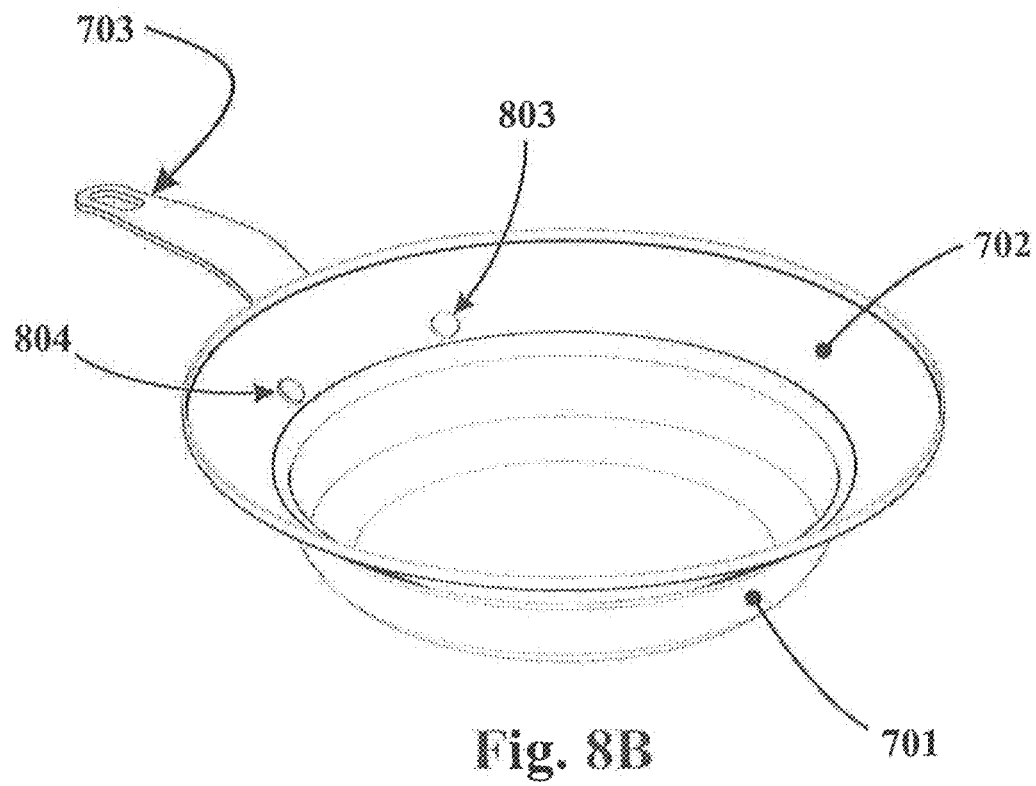
FIG. 8B shows a top perspective view of the pan of FIG. 8A.

FIG. 8B shows how a single metallic lifting handle 703 is joined to the conical section 702 with fastener rivets 803 and 804. The lifting handle can alternately be attached to the vessel architecture by traditional metallic weld technique instead of fastener style rivets. The handle's metallic architecture is externally wrapped with a uniform silicon membrane for improved hand gripping, thermal comfort, grasp and lifting control. Cookware vessel 701 can have a shell thickness of 0.0625 inch, with the range of the shell thickness being between 0.0625 and 0.375 inch and with an acceptable shell thickness being 0.125 inch. The pan can be fabricated with an acceptable metallic material and grade commonly used in the cookware and utensil industry. The handle 703 can have general dimensional parameters that are proportionally sealed to the fry pan vessel which in this example has a 9 inch inside vessel diameter.

Figure 9A:
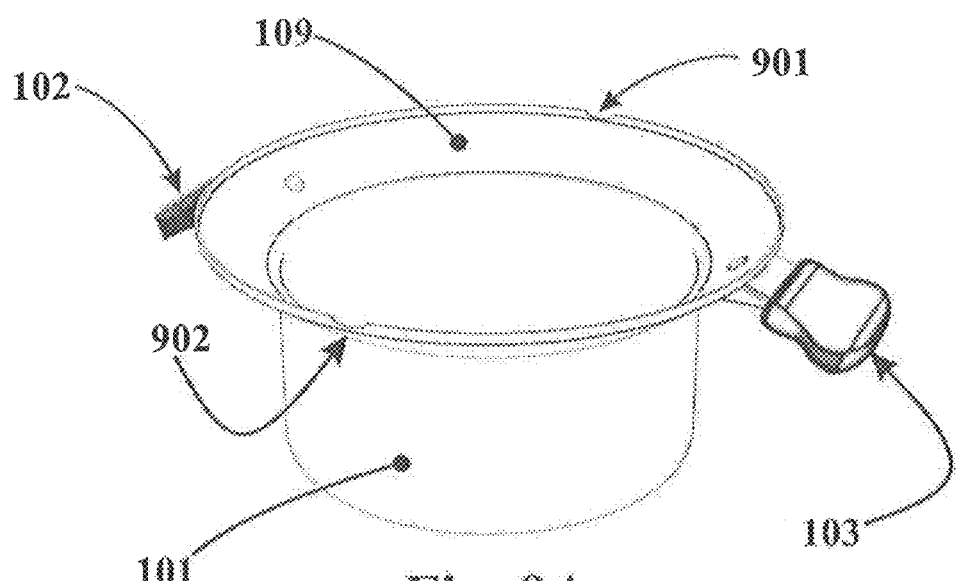
FIG. 9A shows vessel of the type shown in FIG. 1A but also including oppositely arranged pouring spouts formed as notches in the rim protruding portion.

FIG. 9A shows a vessel of the type shown in FIG. 1A and similar utilized a body 101, a conical section 109 and handles 102 and 103 but also optionally including oppositely arranged pouring spouts formed as notches 901 and 902 in the rim protruding portion. A single notch can also be utilized as well as more than two notches. In addition, the shape of each notch can be different. As should be apparent, each notch is designed to function as a pouring spout whereby a tipping of the vessel, will result in the liquid or semi-liquid food to flow out of the body 101, over the conical section 109 and through one of the pouring notches 901 or 902.

Figure 9B:
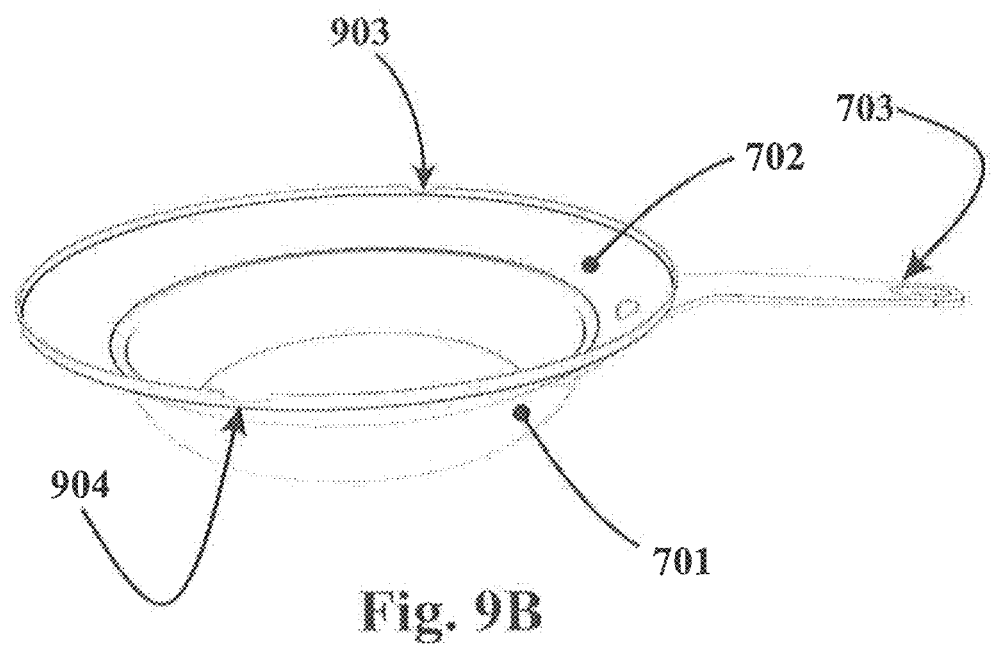
FIG. 9B shows vessel of the type shown in FIG. 8B but also including oppositely arranged pouring spouts formed as notches in the rim protruding portion.

FIG. 9B shows a vessel of the type shown in FIG. 8B and similar utilized a body 701, a conical section 702 and a handle 703 but also optionally including oppositely arranged pouring spouts formed as notches 903 and 904 in the rim protruding portion. A single notch can also be utilized as well as more than two notches. In addition, the shape of each notch can be different. As should be apparent, each notch is designed to function as a pouring spout whereby a tipping of the vessel, will result in the liquid or semi-liquid food to flow out of the body 701, over the conical section 702 and through one of the pouring notches 903 or 904.

The various lids 112, 309, 704 and 721 (especially lids 309, 704 and 721) are, in embodiments, preferably sized so as to be usable with both the pan and pot embodiments.

In embodiments, the cookware vessel 101 (e.g., of the type described in FIG. 5A) can vary in size so as to have a usable interior cooking capacity that is intended to accommodate a volumetric range between a minimum of ½-quart through a maximum of 100-quart capacity.

In embodiments, the vessel 701 (of the type shown in FIG. 8A) can vary in size so as to have an interior cooking capacity that is intended to accommodate a volumetric range between a minimum of ½-quart through a maximum of 100-quart capacity.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A cooking vessel with boil-over prevention, comprising:
   a container bottom;
   a container top comprising a boil-over prevention flared section extending between an annular support flange and a rim;
   said boil-over prevention flared section having:
      an angle of between 25 and 50 degrees relative to the container bottom;
      a cross-sectional thickness; and
      an axial length sufficient to allow the boil-over prevention flared section to function as a steam or condensate collector; and
   at least one handle coupled exclusively to the flared section and extending from a conical outside surface of the flared section,
   wherein, during cooking with the cooking vessel, at least an upper portion of the boil-over prevention flared section is configured to be at least 50 degrees or more cooler than a lower portion of the boil-over prevention flared section located adjacent the support flange.

2. The cooking vessel of claim 1, wherein the cooking vessel is a cooking pot or pasta cooking pot.

3. The cooking vessel of claim 1, wherein the cooking vessel is a frying or sauting pan.

4. The cooking vessel of claim 1, further comprising a cover configured to contact or engage the support flange so as to leave uncovered the boil-over prevention flanged section.

5. The cooking vessel of claim 1, wherein the at least one handle is coupled via at least one fastener or rivet fixed to the boil-over prevention flared section.

6. The cooking vessel of claim 1, wherein the at least one handle comprises a first handle and a spaced-apart second handle.

7. The cooking vessel of claim 1, wherein the at least one handle comprises a first handle, a spaced-apart second handle and a spaced-apart third handle.

8. The cooking vessel of claim 7, wherein the first and second handles are spaced 180 degrees apart.

9. The cooking vessel of claim 8, wherein the first and third handles are spaced 90 degrees apart.

10. The cooking vessel of claim 1, further comprising a cover having a retaining flange configured to engage with the flared section.

11. The cooking vessel of claim 10, wherein the cover comprises sift openings.

12. The cooking vessel of claim 11, wherein the sift openings arranged on a sifting side of the cover which is arranged opposite a closed side of the cover.

13. The cooking vessel of claim 10, wherein the cover is made of a synthetic resin material.

14. The cooking vessel of claim 10, wherein the cover comprises louvers.

15. A method of making the cooking vessel of claim 1, the method comprising:
forming a container body with a flared section extending to a rim; and
attaching at least one handle to the flared section.

16. The cooking vessel of claim 1, wherein the rim is an annular upwardly projecting rim.

17. The cooking vessel of claim 1, wherein:
the rim comprises a first outer diameter;
the container bottom comprises a second outer diameter;
an axial distance between the container bottom and the annular support flange is a first axial distance;
an axial distance between the rim and the annular support flange is a second axial distance;
the second axial distance is shorter than the first axial distance;
the second axial distance is shorter than half of a difference between the first outer diameter and the second outer diameter; and
the flared section is angled between 30 and 45 degrees relative to a center axis the container bottom of the cooking vessel.

18. A cooking vessel with boil-over prevention comprising:
a container bottom;
a container sidewall extending from the container bottom to an annular support flange;
a boil-over prevention flared section extending from the support flange to a rim;
said flared section having an angle of between 25 and 50 degrees relative to the container bottom;
at least one handle fixed directly to the flared section at a position spaced from the annular support flange; and
a cover comprising a peripheral retaining flange having a complimentary shape to that of the flared section and being configured to engage with about half of the flared section when the cover is slid over the rim,
wherein, when the cover is fully installed, the retaining flange retains the cover during tipping over or draining of the cooking vessel.

19. A cooking vessel with boil-over prevention comprising:
a container bottom;
a container sidewall extending from the container bottom to a support flange:
a boil-over prevention flared section arranged between the support flange and a rim;
said flared section having an angle of between 30 and 45 degrees relative to the container bottom;
at least one handle coupled directly to the boil-over prevention flared section; and
a cover comprising:
draining spaces or draining openings; and
a conical-shaped retaining flange configured to engage with an outside conical surface of the flared section when the cover is slid over the rim,
wherein, when the cover is fully installed, the retaining flange retains the cover during tipping over or draining of the cooking vessel.

20. The cooking vessel of claim 19, wherein the cooking vessel is one of:
a cooking pot;
a pasta cooking pot;
a frying pan; or
a sauting pan;
a cooking pot with at least one rim pouring notch;
a frying or sautéing pan with at least one rim pouring notch.

* * * * *